United States Patent [19]

Gennadievich

[11] Patent Number: 5,801,683
[45] Date of Patent: Sep. 1, 1998

[54] IMAGE FORMING AND TRANSFORMING METHODS AND DEVICES FOR SAME

[76] Inventor: Ivanov Anatoly Gennadievich, 690005 Vlaedinostok, Lugovaya 41/46, Russian Federation

[21] Appl. No.: 605,510

[22] Filed: Feb. 26, 1996

[30] Foreign Application Priority Data

Sep. 1, 1993 [RU] Russian Federation ............ 93043508
Dec. 14, 1993 [RU] Russian Federation ............ 93055637

[51] Int. Cl.$^6$ ................................................. G09G 5/00
[52] U.S. Cl. .......................... 345/208; 345/55; 345/205; 382/281
[58] Field of Search .................. 345/55, 205, 208, 345/100, 87, 94, 99, 90; 382/232, 281, 276

[56] References Cited

U.S. PATENT DOCUMENTS

| | | |
|---|---|---|
| 4,148,043 | 4/1979 | Yamauchi et al. |
| 4,448,867 | 5/1984 | Ohkubo et al. |
| 5,512,416 | 4/1996 | Merchant et al. ............ 345/100 |

FOREIGN PATENT DOCUMENTS

| | | |
|---|---|---|
| 0425683 | 5/1991 | European Pat. Off. |
| 0505580 | 9/1992 | European Pat. Off. |
| 9506901 | 3/1995 | WIPO. |

OTHER PUBLICATIONS

PCT International Prelimnary Examination Report, PCT/RU 94/00219, filed May 23, 1994.
Avaev, N.A., "Osnovy mikroelektroniki," 1991, Radio i svyaz, Moscow, pp. 258–260 (with translation).

*Primary Examiner*—Richard Hjerpe
*Assistant Examiner*—Kent Chang
*Attorney, Agent, or Firm*—Darby & Darby

[57] ABSTRACT

A method for forming plane signal (image) comprises modulating signals, applying to inputs of reproducing elements and summing current components of modulated signals.

A device for forming images comprises matrix of reproducing elements, each of the element being provided with signal modulating and signal summing means.

A method for transforming plane signal (image) comprises applying signals to receiving elements, modulating image signals, formed in accepting cells of receiving elements, summing in every column results of modulation, applying signals modulating so got sum signals and summing results of modulation.

A device for transforming image comprises matrix of receiving elements, each of elements being provided with signal modulating mean, also column lines are provided with signal summing and signal modulating means.

12 Claims, 2 Drawing Sheets

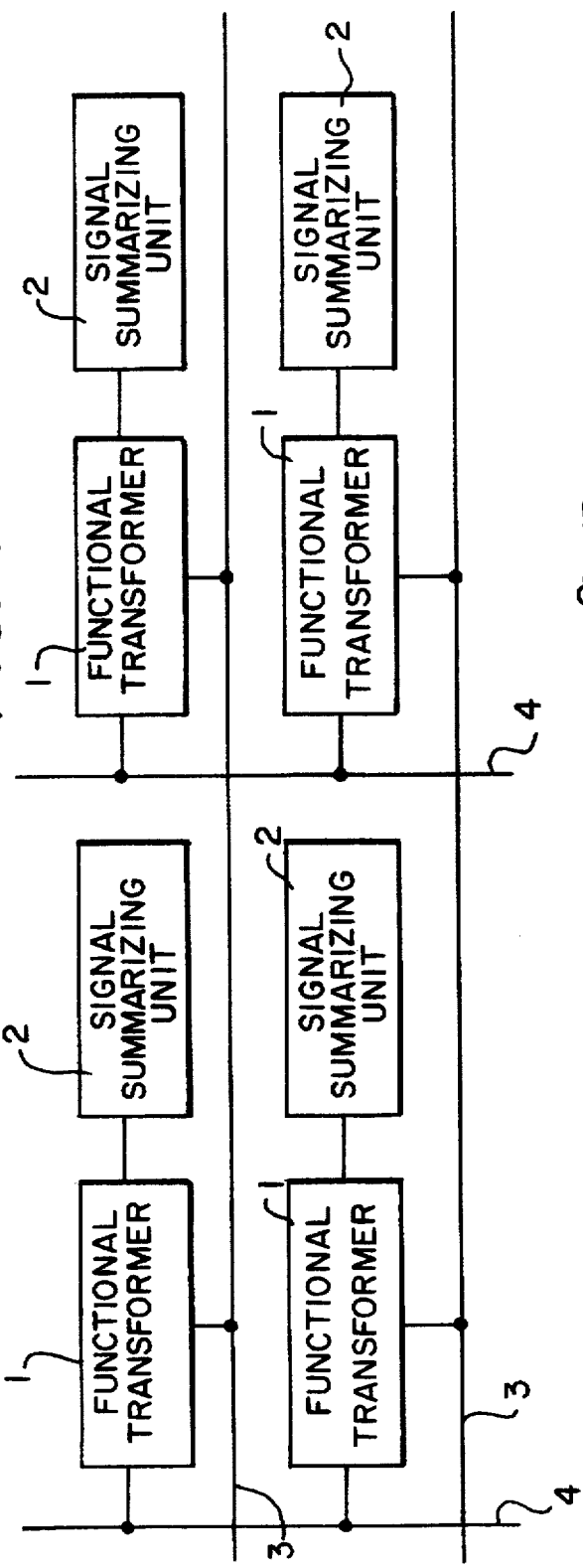
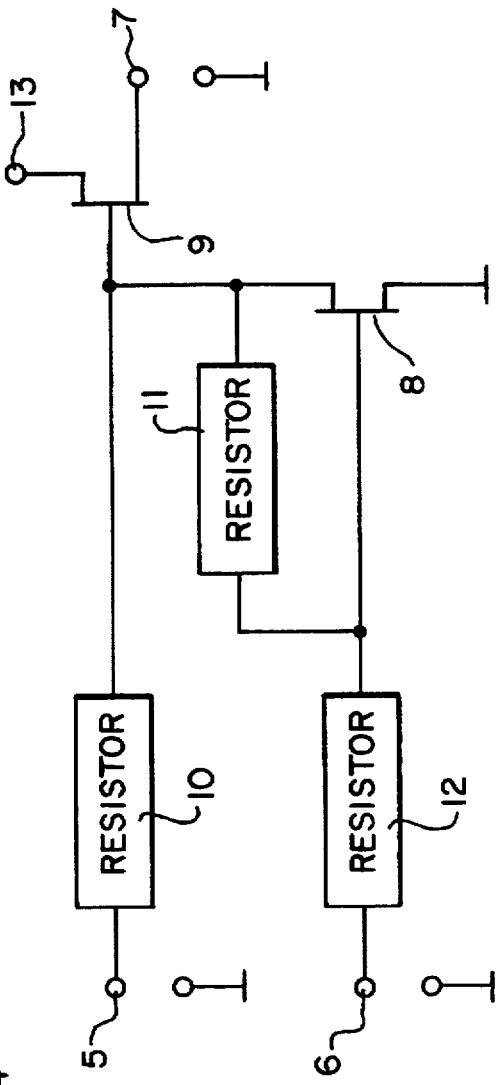

IMAGE FORMING AND TRANSFORMING METHODS AND DEVICES FOR SAME

FIELD OF THE INVENTION

This invention relates to image forming and transforming methods and devices.

BACKGROUND OF THE INVENTION

There is known a method for forming a plane signal (i.e., image) which comprises forming an image on a screen of a cathode-ray tube with matrix of elements charged by a modulated electronic beam (A. A. Slutskin, "Electrostatic photography", M., Iskusstvo, 1984, p.11). The fault of that method is due to the fact that the basic element for realization of that method is a cathode-ray tube which has considerable dimensions and weight, low mechanical solidity, and high power consumption.

There is also known an image forming method which forms the image element-by-element by applying appropriate potential signals to reproducing elements of an indicator plane, arranged in form of orthogonal matrix (I. Ya. Liyamichev, "Plane screen information representing devices", M., Radio and svyaz, 1983, p.40). This method is based on use of a planar device for representing information, which comprises systems of perpendicular horizontal and vertical electrodes with an indicator, placed between the electrodes (I. Ya. Liyamichev, "Plane screen information representing devices", M., Radio and Svyaz, 1983, p.40).

The above mentioned technical solutions are limited to the fact that if an initial signal is compressed by an orthogonal transformation, then to form the image from such signal one needs additional time and devices with which to preform a reverse orthogonal transformation before the image can be visualized.

There is known a method for transforming a plane signal (image) which comprises a photosensitive plane, on which an electrostatic image is formed by scanning a modulated electronic beam across the photosensitive plane (K. Fu et al., "Robototechnics", M., Mir, 1989, p.328–330). However, this method still requires as a main element a cathode-ray tube with all it's inherent faults.

There is also known a method for transforming a plane signal which comprises the element-by-element reading of information contained in receiving elements of a multi-element photo receiving device (N. A. Avaev et all., "Osnovy microelectroniki", M., Radio and Svyaz, 1991, p.258–260). This method is based on use of a matrix of photo receiving elements (N. A. Avaev et all., "Osnovy microelectroniki", M., Radio and Svyaz, 1991, fig.13.4).

The above mentioned technical solutions are limited to the fact that while writing down a numerical signal, for the purpose of decreasing it's volume, it is compressed by orthogonal transformation, and this requires additional time and devices with which to perform compression.

OBJECT AND SUMMARY OF THE INVENTION

An object of present invention is to provide image forming and transforming methods and devices thereof in which procedures for forming and transforming images are combined.

The technical result which may be obtained while implementing present invention consists of an increase in the speed in which images are processed and compressed by orthogonal transformation, and a comparative simplification of construction of such devices.

One solution is provided by a method for forming images comprising the steps of applying signals to reproducing elements, placed on displaying plane in the form of orthogonal matrix, where inputs of reproducing elements are connected to row lines and column lines of the matrix, differs by the fact that in every reproducing element one performs mixing the signals, applying to the inputs of reproducing element, so that current component of resultant signal is proportional to multiplication of the signal from one of inputs of said element to a signal with preset amplitude, and summing current components of resultant signals during the whole cycle of image forming.

The method for forming plane signal according also differs by the fact that signal is formed on the plane where every reproducing element is supplied with output electrode.

Realization of above method is provided by a plane device for forming plane signal (image) made in the form of displaying plane which comprises reproducing elements, placed in the form of orthogonal matrix, where inputs of reproducing elements are connected with row lines and column lines of the matrix, differing by the fact that every reproducing element comprises functional transformer, made, for example, on the base of compensated controllable voltage divider on field effect transistor and amplifier to which signal summing and memorizing unit is connected, which is made, for example, on the base of charge integrator.

Besides the device for forming plane signal differs by the fact that every reproducing element is supplied with electrode for outputting signal, connected to signal summing and memorizing unit's output.

The solution of said problem is also provided by a transforming plane signal (image) which comprises reading signals, formed in accepting cells of receiving elements, placed in the form of orthogonal matrix, and differs by the fact, that in every receiving element one mixes a signal, formed in the accepting cell of the receiving element, with a signal which is applying to the input of that element, connected with appropriate row line, so that current component of resultant signal at the output of receiving element is proportional to multiplication of the signal, formed in the accepting cell the receiving element, to a signal with a preset value, sums in every column line current components of resultant signals from outputs of receiving elements, modulates the results of summing by signals, applying to inputs of column lines, so that value of resultant signal at output of concrete column line is proportional to a multiplication of a signal, got as a result of summing, to a signal with preset value, sums resultant signals from outputs of column lines, after that the procedure is repeated as many times as necessary.

Realization of the method is provided by a plane signal (image) transforming device, made in the form of a plane, which comprises an orthogonal matrix of receiving elements, connected to row lines and column lines of the matrix, and differs by the fact that every receiving element comprises functional transformer, made, for example, on the base of compensated controllable voltage divider on field effect transistor and amplifier, first input of which is connected to output of the accepting sell of the receiving element, second input is connected with appropriate row line and output—with appropriate column line, at the end of every appropriate column line is placed signal's summing and memorizing unit, made, for example, on the base of charge integrator, output of which is connected to first input of said column lines functional transformer, while second input of the transformer is the input of that column line and output is connected to common line.

Besides, the device for transforming plane signal differs by the fact that at the end of common line is additionally placed signal's summing and memorizing unit.

Analyses of distinctive features of applied solution in comparison with distinctive features of analogs and prototypes allows to assert it's correspondence to criteria "newness".

The set of distinctive features of first claim provides the possibility for forming plane signal (image) by orthogonal transformation of initial signal.

The distinctive feature of second claim concretize the manner of outputting formed signal.

The set of distinctive features of third claim provides constructive realization of procedure described in the first claim. Functional transformer provides forming signals proportional to multiplications of signals with appropriate amplitudes, memory and summarizing and unit provides summing memorizing signals feeding from output of functional transformer during the whole cycle of plane signal forming.

The distinctive feature of forth claim concretize the manner of outputting formed plane signal.

The set of distinctive features of fifth claim provides the possibility for reading signal, formed on the plane, by the way of it's orthogonal transformation.

The set of distinctive features of sixth claim of provides constructive realization of procedure, described in fifth claim of the formula. Functional transformer provides forming signals, proportional to multiplications of signals with appropriate amplitudes, summarizing unit provides summing signals applying from outputs of receiving elements.

The distinctive feature of seventh claim allows to form output impulse in form of potential (not currents) signal.

BRIEF DESCRIPTION OF THE DRAWINGS

FIG. 1 shows a schematic diagram of the device for forming an image.

FIG. 2 shows a circuit diagram of a functional transformer according to the invention.

DETAILED DESCRIPTION OF THE INVENTION

Figure 3:
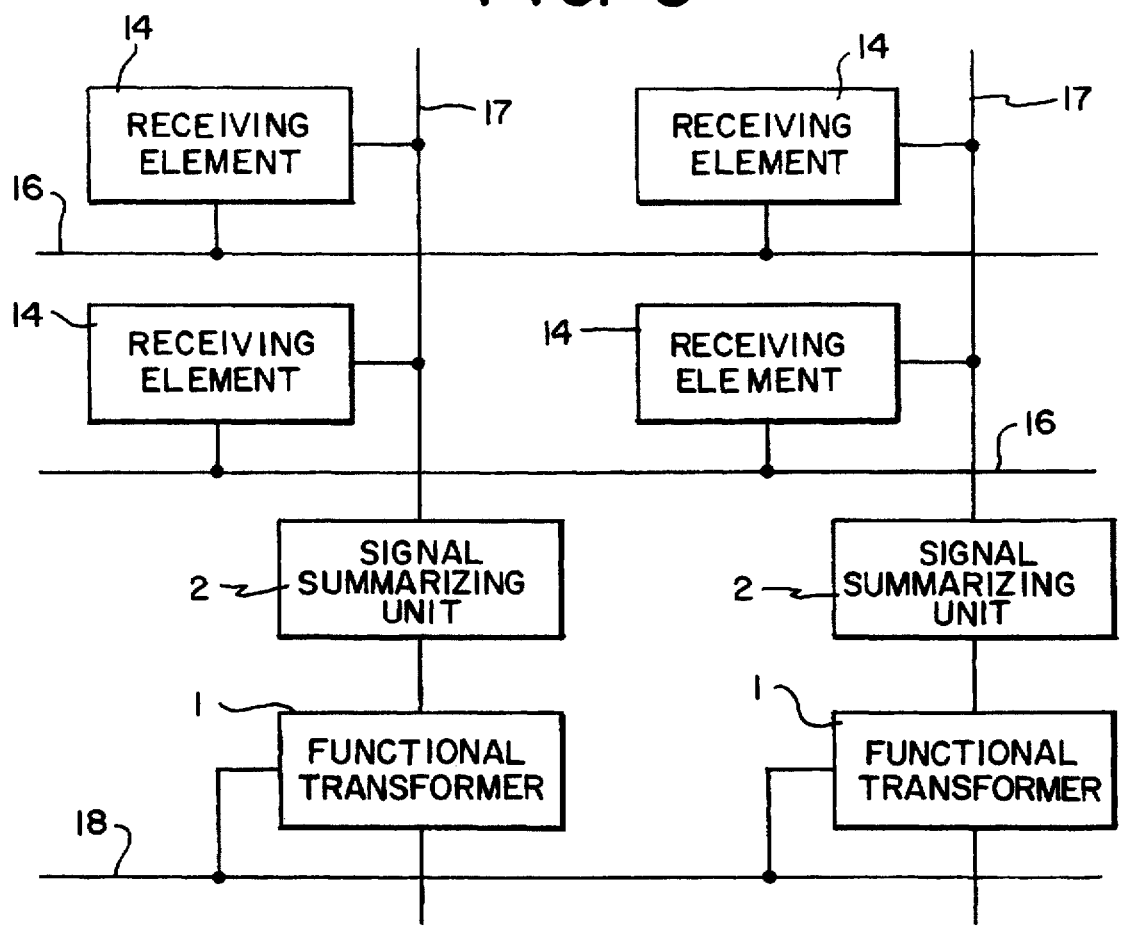
FIG. 3 shows a schematic diagram of the device for transforming an image.
Figure 4:
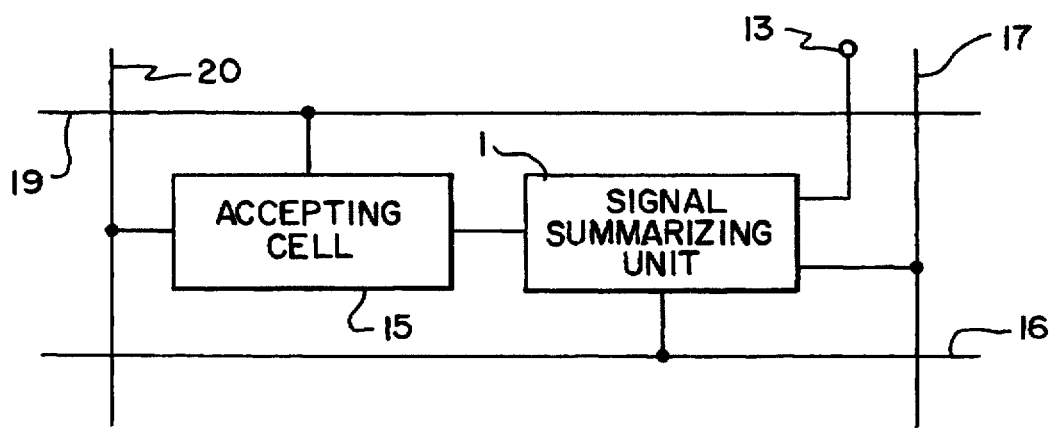
FIG. 4 shows a schematic diagram of a receiving element according to the invention.

The device for forming plane signal (image) comprises a matrix of reproducing or display elements, where every display element includes a functional transformer 1, for example, a compensated controllable voltage divider based on a field effect transistor, and amplifier, to which is connected a signal summarizing unit 2, for example, a charge integrator. Inputs of the functional transformers are connected to row lines 3 and column lines 4.

A method for forming an image according to a preferred embodiment comprises forming the image through an orthogonal transformation of an initial signal by creating in every reproducing element a sum of multiplications of signals, as described next.

If an initial signal is given by a set of values $\{x_{m_1 m_2}\}$; $m_1 = \overline{0, N_{1-1}}$; $m_2 = \overline{0, N_{2-1}}$; then the value of the plane signal at a specific point of the display plane is $$\bar{X}_{k_1 k_2} = \sum_{m_1=0}^{N_1-1} \sum_{m_2=0}^{N_2-1} x_{m_1 m_2} W^{m_2 k_2} W^{m_1 k_1}$$

where $\{W^{m_1 k_1}\}$, $\{W^{m_2 k_2}\}$ are sets of values of chosen orthogonal transformation basic functions, and $\bar{X}_{k_1 k_2}$ is the value of the function, which describes the plane signal at a specific point of the display plane with coordinates $(k_1, k_2)$. To perform this operation to row lines 3. and column lines 4 appropriate signals are applied. For example, the first input 5 of functional transformer 1 of the reproducing element, which has coordinates $(k_1, k_2)$ in the coordinate system of the display plane, has a signal applied according to the value:

$$Y_{m_1 k_2} = \sum_{m_2=0}^{N_2-1} x_{m_1 m_2} W^{m_2 k_2}$$

and the second input 6 has applied a signal $\omega^{m_1 k_1}$, at the output 7 of the functional transformer having the value:

$$X_{k_1 k_2}^{m_1} = Y_{m_1 k_2} W^{m_1 k_1}$$

This transformation is performed simultaneously at every point of the display plane, at which the reproducing elements are placed. This is provided by simultaneously applying signals to the inputs of each of the functional transformers of the reproducing elements. The value of the resultant signals from the output of the functional transformers during the whole cycle of forming an image to are input to the summarizing unit 2, and are summed to form the value of resultant signal as expressed below:

$$\bar{X}_{k_1 k_2} = \sum_{m_1=0}^{N_1-1} X_{k_1 k_2}^{m_1}$$

Each functional transformer 1 includes a compensated controllable voltage divider implemented on field effect transistor and an amplifier, and includes transistors 8,9 and resistors 10, 11, 12.

The procedure for forming the signal is as follows. The value of the voltage divided output signal $U_a$ is related to the value of input signal $U_e$ which is applied to the first input 5, by the relation $U_a = kU_e$, where the coefficient k varies over the interval $(0<k<1)$ and is further related to the value of the signal $U_{ctrl}$ applied to the control input 6. $U_{ctrl}$ is defined as:

$$U_{ctrl} = U_P^2 \{(1-k)/k\}/(I_{DS} R_1) + U_P$$

$$/U_{DS} \ll U_K; R_1, R_2 \sim R_3 \gg R_{DS}/,$$

where $U_{DS}$—drain-source voltage $U_K$—knee point voltage $U_P$—current cut-off voltage $U_{GS}$—gate-source voltage $I_{DS}$—drain-source current at $U_{GS}=0$ $R_1$—resistance of resistor 10

$R_2$—resistance of resistor 11

$R_3$—resistance of resistor 12

$R_{DS}$—drain-source resistance

To obtain an output signal of appropriate value, $U_a = \Phi \rho$, where $\rho$ varies in interval $(-\frac{1}{2} < \rho < \frac{1}{2})$, the following steps are performed:

1. A signal with amplitude $\Phi$ is applied to output 5, and a signal $$U_{ctrl}' = U_P^2[(1-\chi)/\chi]/(I_{DS}R_1) + U_P$$

where $\chi = \rho + \frac{1}{2}$, is applied to the second (control) input 6. The output signal at the output of the divider, $U_a' = \Phi_\chi = \Phi_\rho + \frac{1}{2}\Phi$), is applied to the control gate of the transistor 9 to form at the output 7 an appropriate value of current and to charge the accumulating element of the summarizing unit 2.

2. A signal $$U_{ctrl}'' = U_P^2/(I_{DS}R_1) + U_P$$

is then applied to the second input 6 so that the output signal applied to the control gate of the transistor 9 is: $U_a'' = (\frac{1}{2}) \Phi$. Changing the voltage polarity at feeding input 13 reverses the current, and discharges accumulating element of the summarizing unit 2. The resultant signal formed in the summarizing unit 2 is proportional to the desired value $U_a = U_a' - U_a'' = \Phi\rho$.

A device for transforming an image according to the invention is made in form of a plane, which includes a matrix of receiving elements, where every element 14 is connected to row line 16 and to column line 17. At the ends of column lines 17 are installed the summarizing units 2 with their outputs connected to the first inputs of the column functional transformers 1, while the second input of each transformer is connected to column lines and the output of each transformer is connected to common line 18.

FIG. 3 shows the schematic diagram of a receiving element, which in addition to an accepting cell 15 comprises the functional transformer 1 having its first input connected to the output of the accepting cells and its second input connected to the row line 16, and its output connected to column line 17. Commutation of the accepting cells 15 is performed, for example, with the help of an additional set of row lines 19 and column lines 20.

A method for transforming an image is due to the fact that formed on a plane signal is transformed into a sequence of electric impulses, so that outputting of information from receiving elements of the device is performed by orthogonal transformation of the initial plane signal.

If $\overline{X}_{k_1 k_2}$ ($\chi$ amplitude of electric signal) is formed in accepting cell 15 of the receiving element with coordinates ($k_1, k_2$) in the coordinate system of the display plane, then the signal at output of the device as a result of one step of commutation is $$x_{m_1 m_2} = \sum_{k_1=0}^{N_1-1} \sum_{k_2=0}^{N_2-1} \overline{X}_{k_1 k_2} W^{m_2 k_2} W^{m_1 k_1}$$

where $\{W^{m_1 k_1}\}, \{W^{m_2 k_2}\}$—are sets of values of orthogonal transformation basic functions at points with coordinates ($k_1, k_2$); $m_1 = \overline{0, N_1-1}$; $m_2 = \overline{0, N_2-1}$.

To perform this operation to the row lines 16 the appropriate signals are simultaneously applied. To the first input of receiving element's flnctional transformer is applied a signal proportional to the image signal formed in accepting cell is of this element $\overline{X}_{k_1 k_2}$ and to the second input, connected to row line 16, a signal $\omega^{m_1 k_1}$ at output of functional transformer is $$X_{k_1 k_2}^{m_1} = \overline{X}_{k_1 k_2} W^{m_1 k_1}$$

This transformation is performed simultaneously in every receiving element of the device, which is provided by the simultaneous application of signals to the inputs of all functional transformers 1 of the receiving elements. In the summarizing units 2, installed at ends of column lines 17, are formed signals, proportional to sums of the signals from the outputs of the receiving elements. Thus, formed signals are applied to the first inputs of the column functional transformers 1. To the second inputs of the column functional transformers, which are the inputs of the column lines 17 signals are simultaneously applied at the outputs of the column functional transformers 1 to have the value:

$$Y_{k_2}^{m_1 m_2} = \sum_{k_1=0}^{N_1-1} X_{k_1 k_2}^{m_1} W^{m_2 k_2}$$

where $k_2$ are the coordinates of the column lines 17.

The total (currents) signal in the common line 18 is then $$x_{m_1 m_2} = \sum_{k_2=0}^{N_2-1} Y_{k_2}^{m_1 m_2}$$

The procedure then is repeated with other values of $m_1$, $m_2$: $m_1 = \overline{0, N_1-1}$; $m_2 = \overline{0, N_2-1}$.

I claim:

1. A method for forming from a compressed data signal an image on a display device which includes an array of display elements spaced along row and column lines, comprising the steps of:

(a) applying a first signal corresponding to said compressed data value to each said display element;

(b) applying a second signal of a predetermined value to each said display element;

(c) multiplying said first and said second signal applied to each of said display elements to obtain a resultant signal for each display element proportional to the multiplication of said first signal and said second signal; and (d) activating the corresponding display element with said resultant signal to display the data for the display element.

2. A method as in claim 1 wherein said compressed data signal comprises a matrix of data values, one said data value for each display element.

3. A method as in claim 2 further comprising the step of transforming said compressed data signal by decompression to provide said first signal.

4. A method as in claim 3 wherein said compressed data signal is an orthogonal transformation of the data to be displayed and wherein said transforming step comprises the step of reverse orthogonal transforming said data signal.

5. A method as in claim 4 wherein said step of reverse orthogonal transformation is carried out at said data elements.

6. A method as in claim 1 further comprising the step of repeating steps (a), (b), (c) and (d) to form layers of images.

7. A method as in claim 6 wherein said step of repeating further comprises saving the values of said resultant signals for each data value at each display element during each repetition.

8. The method as in claim 7, wherein the step of saving the values of the resultant signals comprises summing a current component of each said signal during the whole cycle of forming the image.

9. A method as in claim 6 wherein each said resultant signal has a current component and further comprising the step of storing said current component and summing the stored components.

10. A method as in claim 1 wherein each said resultant signal has a current component and further comprising the step of storing said current component.

11. A display device on which an image is formed having an array of display elements arranged alone row and column lines to each receive a data signal corresponding to an element of the image to be formed, each display element comprising:

a functional transformer for receiving said data signal, said functional transformer having a voltage divider and an amplifier; and a signal summing and memorizing unit having a charge integrator connected to said functional transformer.

12. The device as in claim 11, wherein the voltage divider is a compensated controllable voltage divider.

* * * * *